(12) United States Patent
Laukkanen et al.

(10) Patent No.: US 8,807,870 B2
(45) Date of Patent: Aug. 19, 2014

(54) METHOD FOR TREATING SOIL MATERIAL

(75) Inventors: Antti Laukkanen, Helsinki (FI); Jan-Erik Teirfolk, Turku (FI); Laura Alakukku, Hyvinkää (FI); Martti Sarkia, Helsinki (FI); Helinä Hartikainen, Helsinki (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 13/700,694

(22) PCT Filed: Jun. 1, 2011

(86) PCT No.: PCT/FI2011/050513
§ 371 (c)(1),
(2), (4) Date: Nov. 28, 2012

(87) PCT Pub. No.: WO2011/151523
PCT Pub. Date: Dec. 8, 2011

(65) Prior Publication Data
US 2013/0108373 A1    May 2, 2013

(30) Foreign Application Priority Data
Jun. 2, 2010  (FI) .................................... 20105623

(51) Int. Cl.
*B09C 1/08*     (2006.01)

(52) U.S. Cl.
USPC .................................. 405/128.5; 405/128.75

(58) Field of Classification Search
USPC ................ 405/128.1, 128.15, 128.45, 128.5, 405/128.7, 128.75, 258.1, 302.4, 302.6
See application file for complete search history.

(56) References Cited

U.S. PATENT DOCUMENTS

| 3,943,078 | A | 3/1976 | James |
| 5,207,826 | A * | 5/1993 | Westland et al. .......... 106/162.5 |
| 6,231,657 | B1 | 5/2001 | Cantiani et al. |
| 6,602,994 | B1 | 8/2003 | Cash et al. |
| 2010/0285962 | A1 * | 11/2010 | Hoffmann et al. ............ 504/142 |

FOREIGN PATENT DOCUMENTS

| JP | 49-27772 B | 7/1974 |
| JP | 2005-97392 A | 4/2005 |
| WO | WO 01/66600 A1 | 9/2001 |
| WO | WO 2004/035633 A2 | 4/2004 |

OTHER PUBLICATIONS

Finnish Search Report issued in Finnish Application 20105623 on Feb. 9, 2011.
International Search Report issued in PCT/FI2011/050513, dated Sep. 9, 2011.

* cited by examiner

*Primary Examiner* — Frederick L Lagman
(74) *Attorney, Agent, or Firm* — Birch, Stewart, Kolasch & Birch, LLP

(57) ABSTRACT

The invention relates to a method for treating soil material. According to the invention, the soil material is treated by a mixture composition containing at least microfibrillated cellulose and water.

10 Claims, 4 Drawing Sheets

METHOD FOR TREATING SOIL MATERIAL

FIELD OF THE INVENTION

Figure 1:
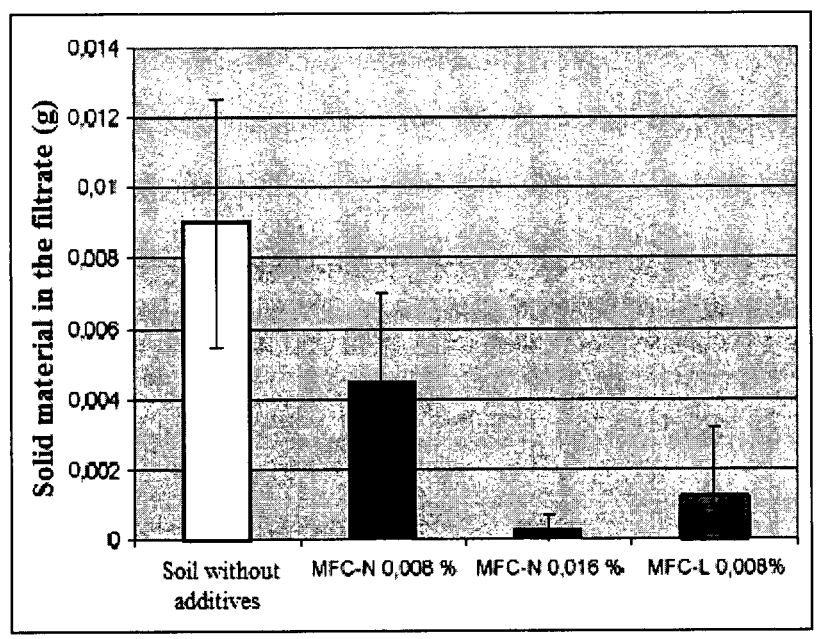

The invention relates to the method defined in the preamble of claim 1 for treating soil material.

BACKGROUND OF THE INVENTION

Known from the prior art are various methods for treating masses of soil.

It is known that soil cultivation weakens the structure and increases erodability of soil. The erosion, water erosion as well as wind erosion, is a growing problem. As a consequence of water erosion, nutritious earth material drifts away, e.g. from culture lands with heavy rains. In addition, if eroding earth material migrates to a watercourse, the fertilizers, such as phosphorus, bound from the earth material and to the soil particles increase eutrophication. In addition, it is known that dry soils erode easily because they encompass few organic acids and natural polysaccharides protecting the soil against the shear forces of running water. In wind erosion, the particles of the soil drift away from open areas, e.g. prairies, deserts or opencast mines. Erosion has been reduced by improving the structure of soil by adding synthetic or natural polymers thereto. The most typically used polymeric additive is polyacrylamide which can be added e.g. to irrigation water. The consumption of polyacrylamide has typically been approximately 100 to 300 kg per hectare.

Furthermore, known from the prior art are many methods for improving the quality of soil material, for example fertilization. In addition, known from the prior art are many methods for spreading seeds to the soil. According to one known method, seeds can be provided to the soil by an aqueous mixture of polyacrylamide.

Polyacrylamide has a high molar mass, and it binds many particles. Conventionally, polyacrylamide is used in the cationic or anionic form. A problem in the use of polyacrylamide is that it is not biodegradable but accumulates in the soil. In addition, a problem in the use of polyacrylamide is that small amounts of acrylamide monomeric residues may migrate to plants and thereby e.g. to foodstuffs.

In addition, known from the prior art is microfibrillated cellulose and exploration of the possibilities for the utilization thereof. In research on microfibrillated cellulose it has been discovered that it can be used in different applications e.g. in papermaking as a component improving the properties of paper. It is known that microfibrillated cellulose has a large specific surface area, and has thereby a large bonding area in comparison with the material weight.

In publication WO 0166600 A1 a composition containing cationically modified microfibrillated cellulose and water and use of the composition to in the treating of soil are disclosed. In publication U.S. Pat. No. 6,602,994 B1 a composition containing anionically modified microfibrillated cellulose and water and use of the composition for the treating of soil are disclosed.

OBJECTIVE OF THE INVENTION

An objective of the invention is to disclose a completely new type of a method for treating soil material.

SUMMARY OF THE INVENTION

The method according to the invention is characterized by what has been presented in the claims.

LIST OF FIGURES

Figure 2:
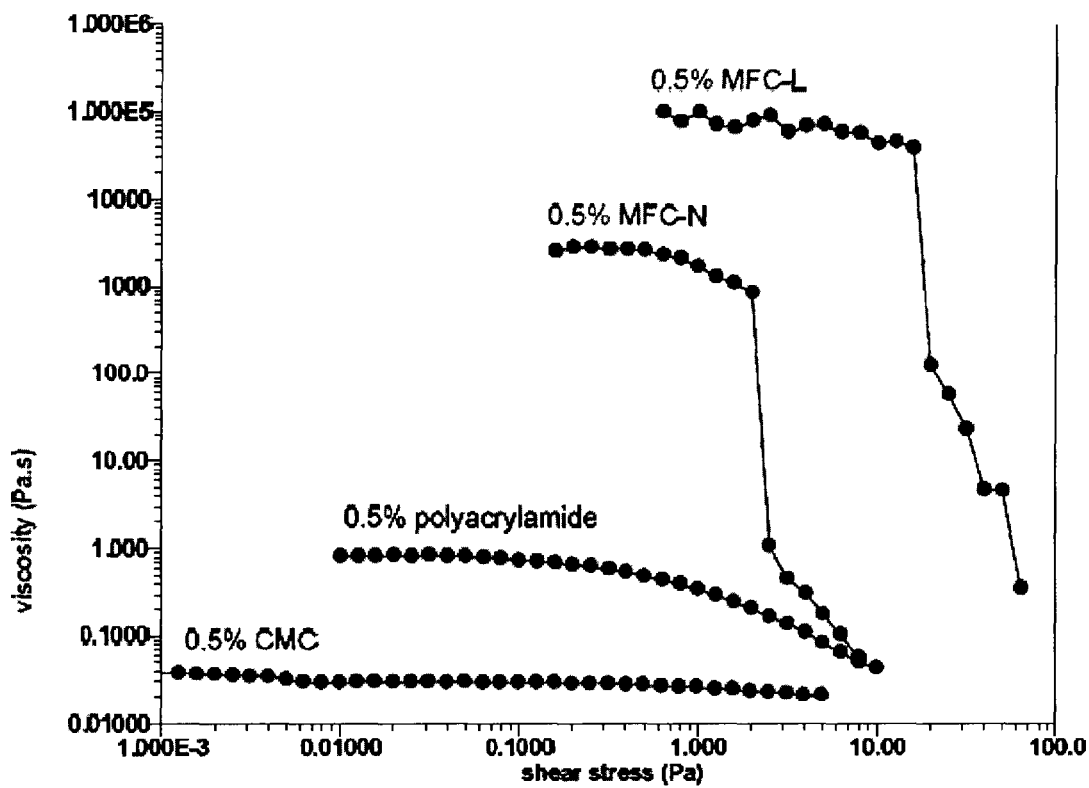
Figure 3:
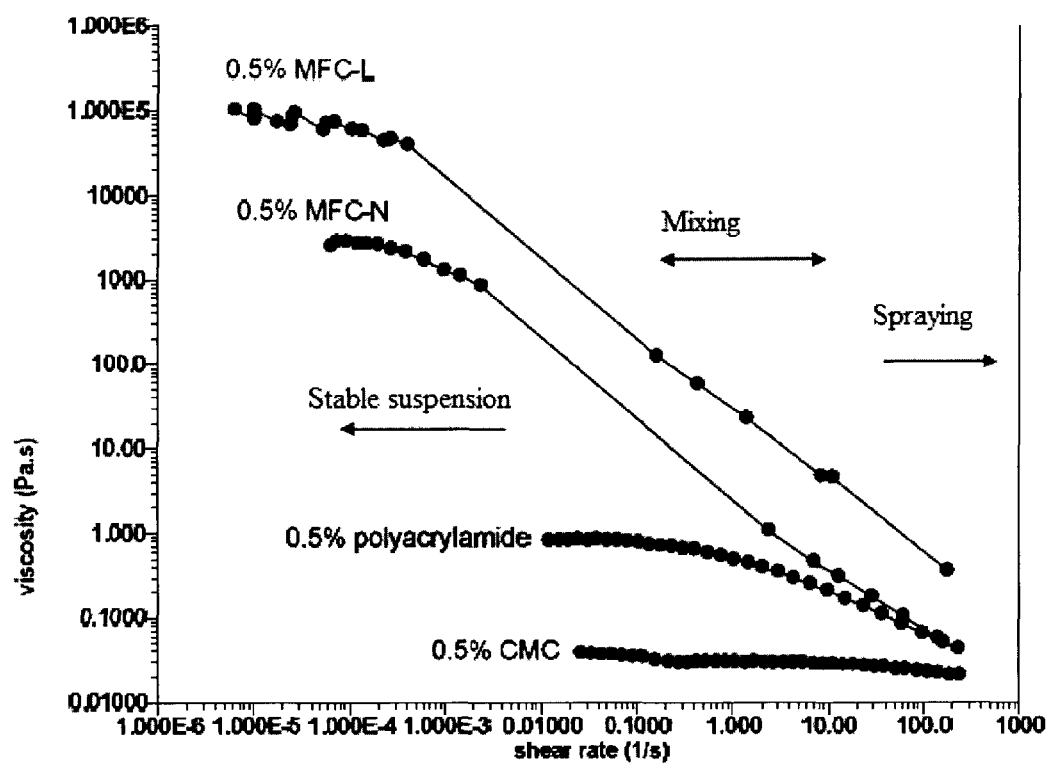
Figure 4:
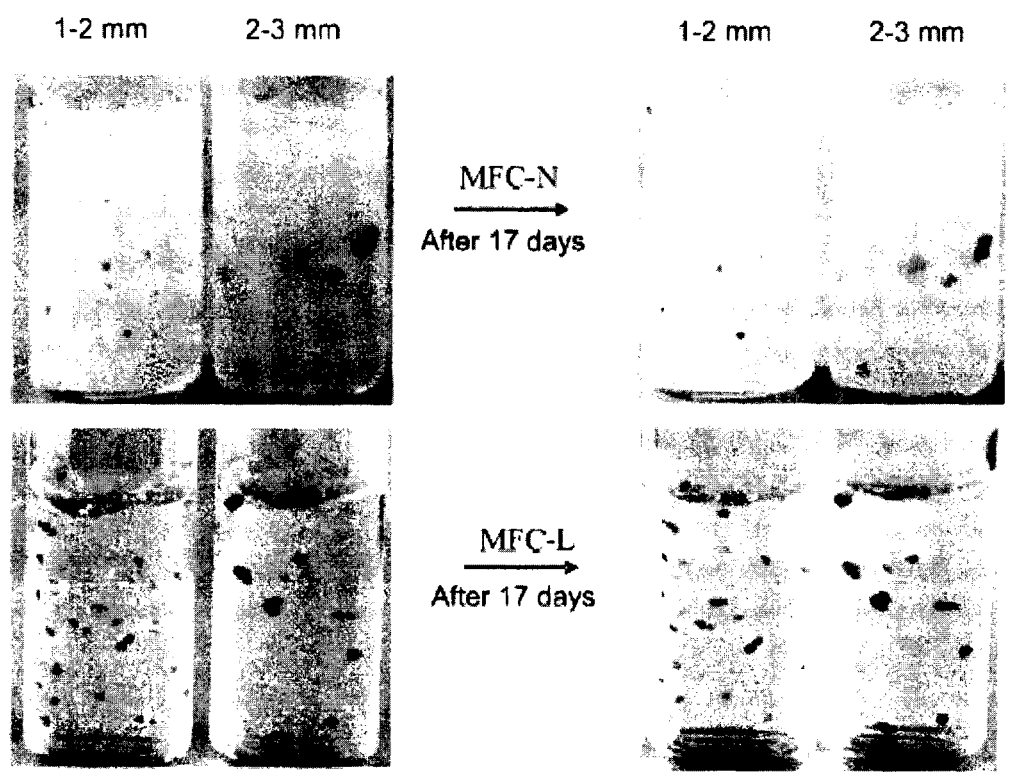

FIG. 1 shows the solid material from filtrates of dry soil material treated with microfibrillated cellulose as a function of the concentration of microfibrillated cellulose, FIG. 2 shows the viscosity in dispersions of microfibrillated cellulose as a function of the shear stress, FIG. 3 shows the viscosity in dispersions of microfibrillated cellulose as a function of the shear rate, and FIG. 4 shows the stability of sand/gravel particles in a 0.5% dispersion of microfibrillated cellulose.

DETAILED DESCRIPTION OF THE INVENTION

The invention is based on a method for treating soil material, e.g. for stabilizing the soil, controlling erosion, protecting the soil, improving the soil and/or moisturizing the soil. According to the invention, the soil material is treated by a mixture composition containing at least microfibrillated cellulose and water.

The invention is specifically based on stabilizing the soil and controlling the erosion ecologically by microfibrillated cellulose. Surprisingly, it has been discovered that microfibrillated cellulose is a functional material for the treating of soil and that it may function as a substituent for polyacrylamide in the treating of soil.

The soil material to be treated may be any soil material in any area, e.g. arable land, prairie, desert, open-pit mine, steep slope or the like.

In one embodiment of the invention the average particle size of the particles in the soil material to be treated is less than 0.06 mm. As an example of the soil material of this size class, material that is finer than the medium fine sand fraction can be mentioned.

In one embodiment of the invention the average particle size of the particles in the soil material to be treated is 0.06 to 0.2 mm. As an example of the soil material of this size class, medium fine sand can be mentioned. In one embodiment of the invention the average particle size of the particles in the soil material to be treated is 0.2 to 1 mm. As an example of the soil material of this size class, fine sand can be mentioned. In one embodiment of the invention the average particle size of the particles in the soil material to be treated is more than 1 mm.

The microfibrillated cellulose may be formed from any botanical raw material, e.g. wood-based raw material, such as hardwood raw material or softwood raw material, or other botanical raw material containing cellulose. Botanical raw materials may include e.g. agricultural waste, grasses, straw, bark, caryopses, peels, flowers, vegetables, cotton, maize, wheat, oat, rye, barley, rice, flax, hemp, abaca, sisal, kenaf, jute, ramie, bagasse, bamboo or reed or different combinations thereof. Alternatively, the raw material of microfibrillated cellulose can be isolated from certain cellulose-producing microorganisms, such as the genera *Acetobacter, Agrobacterium, Rhizobium, Pseudomonas* or *Alcailgenes*, preferably the genera *Acetobacter* and most preferably the species *Acetobacter xylinum* or *Acetobacter pasteurianus*.

Microfibrillated cellulose in this context means cellulose microfibrils or a cellulose microfibril bundle isolated from the above-mentioned raw materials. The aspect ratio of microfibrils is typically very high; the length of microfibrils may be more than one micrometer and the number-average diameter is typically less than 200 nm. The diameter of microfibril bundles may be greater but is usually less than 1 µm. The smallest microfibrils are similar to the so-called elemental fibrils, the diameter of which is typically 2 to 12 nm. The dimensions and fiber structures of microfibrils or microfibril bundles depend on the raw material and the fragmentation method. Microfibrillated cellulose may also contain hemicellulose, the amount of which depends on the raw material used. Microfibrillated cellulose is isolated from the above-described cellulose-containing raw material with an apparatus suitable for the purpose, e.g. a grinder, comminutor, homogenizer, fluidizer, micro- or macrofluidizer and/or ultrasonic disintegrator. Microfibrillated cellulose may also be obtained directly by a fermentation process using microorganisms e.g. from the genera *Acetobacter, Agrobacterium, Rhizobium, Pseudomonas* or *Alcailgenes*, preferably the genera *Acetobacter* and most preferably the species *Acetobacter xylinum* or *Acetobacter pasteurianus*.

The fibrils of microfibrillated cellulose are parallel fibers which are very long relative to the diameter. Microfibrillated cellulose has a large specific surface area. Thus, microfibrillated cellulose is able to form many bonds and bind many particles. In addition, microfibrillated cellulose has good strength properties.

In one embodiment the microfibrillated cellulose may be any chemically or physically modified derivative of cellulose consisting of microfibrils or of microfibril bundles. The chemical modification may be based e.g. on a carboxy-methylation, oxidation, esterification and etherification reaction of the cellulose molecules. The modification may also be carried out by physical adsorption of anionic, cationic or non-ionic materials or combinations thereof to the surface of cellulose. The modification may be performed before, during or after the manufacture of microfibrillated cellulose.

In one embodiment of the invention the mixture composition contains chemically unmodified microfibrillated cellulose. In one embodiment, modified cationic microfibrillated cellulose is used in the mixture composition, in which case the microfibrillated cellulose is made to bind to anionic particles of the soil material. In one embodiment of the invention, modified anionic microfibrillated cellulose is used in the mixture composition. In one embodiment the microfibrillated cellulose is modified to be mildly anionic. In one embodiment the mixture composition containing microfibrillated cellulose modified to be anionic is added with a calcium-containing compound, e.g. lime or gypsum, whereupon the mixture composition binds better to anionic soil particles. Instead of adding lime or gypsum, another calcium compound or cationic counter-ion or cationic polymer or different mixtures of the above-mentioned compounds can also be used.

In one embodiment of this invention the microfibrillated cellulose does not contain microfibrillated cellulose originating from a product produced by bacterial method or by microbes.

In one embodiment, microfibrillated cellulose is referred to as nanocellulose. Nanocellulose consists at least mainly of nanosize-class fibrils, the diameter of which is less than 100 nm, but the length of which may be within the µm-size class or smaller. Alternatively, microfibrillated cellulose may be referred to as nanofibrillated cellulose, nanofibril cellulose, nanofibers of cellulose, nanoscale fibrillated cellulose, microfibril cellulose or microfibrils of cellulose. Preferably, microfibrillated cellulose in this context does not mean the so-called cellulose nanowhiskers.

The microfibrillated cellulose may be formed by any manner known per se in the art from a cellulose-based raw material. In one embodiment of the invention the mixture composition containing microfibrillated cellulose is formed from a dried and/or concentrated cellulose raw material by fibrillating. In one embodiment the cellulose raw material is concentrated. In one embodiment the cellulose raw material is dried.

In one embodiment the cellulose raw material is dried and concentrated. In one embodiment the cellulose raw material is chemically preprocessed to disintegrate more easily, i.e. labilized, whereby the mixture composition containing microfibrillated cellulose is formed from the chemically labilized cellulose raw material. For example, the N-oxyl (e.g. 2,2,6,6-tetramethyl-1-piperidine N-oxide) mediated oxidation reaction provides a very labile cellulose raw material which is exceptionally easy to disintegrate into microfibrillated cellulose. This type of chemical preprocessing is described for example in patent applications WO 09/084,566 and JP 20070340371. Microfibrillated cellulose provided by the above-described chemical modification, i.e. labilization, is referred to in this application as "MFC-L" as distinct from microfibrillated cellulose not obtained by labilization, i.e. "MFC-N".

In one embodiment the mixture composition according to the invention is in the form of a dispersion, e.g. in a gel-type or gelatinous form, or in the form of a dilute dispersion. In one embodiment the mixture composition has a very strong gel structure. The gel-type structure contains networks of solid microfibrillated fibers, i.e. flocks. By mixing and/or pumping, the flocks disintegrate and the mixture starts to flow, whereby it can be e.g. sprayed. The mixture composition has a high viscosity at rest, and in the static state it solidifies.

In one embodiment of the invention the particles of soil material are bound to the soil material by the composition mixture, preferably e.g. to stabilize the soil material and to control erosion. By binding the soil particles, their drifting away is prevented, which may prevent erosion and also eutrophication. Currently, the phosphorus particles that cause eutrophication migrate to watercourses with the soil particles. When the water of the mixture composition provided in connection to the soil material dries, the soil particles have bound to the soil material by virtue of microfibrillated cellulose, and will not dissolve e.g. during rain. In one embodiment the microfibrillated cellulose of the mixture composition bonds the soil particles together.

In one embodiment of the invention the mixture composition is spread to the surface of soil material. In one embodiment the mixture composition is spread by spraying. Preferably, the mixture composition remains on the surface of the soil and will not flow. In one embodiment the mixture composition may be sprayed on slopes, deserts or other equivalent destinations to prevent wind erosion.

In one embodiment of the invention the mixture composition is mixed with the soil material.

In one embodiment, the soil material is treated by the mixture composition in order to form a surface crust to the soil material. The formation of the surface crust, the thickness and other properties thereof affect the wind and water erosion resistance. In treating the soil material by the mixture composition, an elastic and flaky crust is provided to the surface of the soil. The elastic surface of the soil provided by the mixture composition protects the soil for example from the effect of raindrops as water is able to migrate deeper into the soil.

In one embodiment the surface crust is formed to the soil material by treating the soil material with a mixture composition containing chemically unmodified microfibrillated cellulose. In one embodiment the surface crust is formed to the soil material by treating the soil material with a mixture composition containing modified cationic microfibrillated cellulose. In one embodiment the surface crust is formed to the soil material by treating the soil material with a mixture composition containing microfibrillated cellulose modified to be anionic. In one embodiment the surface crust is formed to the soil material by treating the soil material with a mixture composition containing microfibrillated cellulose modified to be anionic and a compound selected from the group of a compound containing calcium, a cationic counter-ion and a cationic polymer and the mixtures thereof.

In one embodiment, the soil material is treated by the mixture composition in order to form soil aggregates. The formation of the aggregates modifies the soil and makes it more porous and looser. In other words, as the size of the aggregates grows, the volume of the pores left between the aggregates grows as well. As the volume of the pores grows, water provided on the soil infiltrates though earth layers and will not accumulate on the surface of the soil. Water that has accumulated on the surface of the soil may cause surface runoff, developing erosion. Particularly the mixture composition containing chemically unmodified microfibrillated cellulose forms aggregates with the treated soil material. As a consequence of the formation of aggregates, the soil also resists mechanical stress such as the effect of wind better.

In one embodiment, the soil aggregates are formed by treating the soil material with a mixture composition containing chemically unmodified microfibrillated cellulose. In one embodiment, the soil aggregates are formed by treating the soil material with a mixture composition containing chemically modified cationic microfibrillated cellulose. In one embodiment, the soil aggregates are formed by treating the soil material with a mixture composition containing microfibrillated cellulose modified to be anionic. In one embodiment, the soil aggregates are formed by treating the soil material with a mixture composition containing microfibrillated cellulose modified to be anionic and a compound selected from the group of a compound containing calcium, a cationic counter-ion and a cationic polymer and the mixtures thereof.

In one embodiment of the invention the water content of the mixture composition is adjusted, e.g. by drying, evaporating, adding water or by other suitable manner. In one embodiment, the microfibrillated cellulose is dried.

In one embodiment of the invention the mixture composition contains microfibrillated cellulose in an amount of less than 5 w-%, in one embodiment less than 3 w-%, in one embodiment less than 2 w-%.

In one embodiment, water is added to the mixture composition before spreading or mixing it to the soil material.

In one embodiment the mixture composition is added to water, e.g. to the irrigation water. In this case, the irrigation water contains gel-type particles of the mixture composition, binding water to soil for a longer time than the irrigation water by itself.

In a preferred embodiment the mixture composition brings moisture to the soil.

In one embodiment the mixture composition may contain the desired additives which are to be utilized in treating the soil material. Additives to be added to the mixture composition may include e.g. different seeds, fertilizer particles, fertilizer solution and combinations thereof. Particulate additives form a stable suspension in the mixture composition according to the invention when it is in the static state. In one embodiment the mixture composition according to the invention may substitute for synthetic hydrocolloids. In one embodiment the additives, such as seeds or fertilizer particles, are encapsulated with the mixture composition and provided to the soil. In drying, the mixture composition releases and binds the additives to the soil.

The method according to the invention may be applied for use in various soil treating purposes. By the method according to the invention, erosion caused by water or wind can be prevented or significantly reduced, moisture, seeds and/or suitable soil conditioners can be brought to the soil and the soil can be stabilized. The mixture composition according to the invention can be utilized together with the soil material as a good substrate.

The method according to the invention is an ecological alternative to soil treating. The microfibrillated cellulose and the mixture composition to be used in the method according to the invention are biodegradable. An advantage of the invention is that microfibrillated cellulose can substitute for synthetic polymers in the treating of soil material.

By the invention, erosion can be controlled and reduced, the soil material stabilized, conditioned and moistened. The soil treating method according to the invention can be carried out easily without large investments.

The embodiments of the invention presented above can be combined freely with each other. Many of the embodiments can be combined in order to form a new embodiment. The method to which the invention relates may include one or more of the above-mentioned embodiments of the invention.

EXAMPLES

The invention will be described in more detail by the accompanying examples with reference to the accompanying figures.

In the tests, the treating of soil material with a mixture composition containing microfibrillated cellulose was examined.

First, a mixture composition with chemically unmodified microfibrillated cellulose, MFC, was prepared. Sulphate pulp manufactured from birch was ground by a commercial grinder for such a period that the size of the fibers had decreased to a size class having a diameter of appr. 50 to 200 nm. This mixture composition is referred to as MFC-N.

Then, a mixture composition with chemically modified microfibrillated cellulose was prepared. Sulphate pulp manufactured from birch and modified chemically before grinding to disintegrate more easily, i.e. labilized, was ground mechanically by a commercial grinder for such a period that the size of the fibers had decreased to a size class having a diameter of appr. 2 to 50 nm. This mixture composition is referred to as MFC-L.

The soil material to be examined was typical clay earth isolated from arable lands having a high phosphorus level. The soil sample was screened to a crumb size class of 2 to 5 mm.

Example 1

Stabilization of Dry Soil Material

Ability of microfibrillated cellulose to stabilize dry soil particles was examined in the following manner:

First, dry soil material screened to 25 grams was tipped into an assay vessel. 4.0 ml of MFC-N or MFC-L aqueous dispersion or, in the case of control samples, 4.0 ml of distilled water was added evenly onto the dry earth samples. The microfibrillated cellulose was added in the case of MFC-N as a 0.05% (2 mg/4 ml) or 0.10% (4 mg/4 ml) dispersion and in the case of MFC-L as a 0.05% (2 mg/4 ml) dispersion. The MFC content of appr. 0.008% or 0.016% was thus provided in the soil samples. Three replicate samples were prepared.

The treated earth crumbs were incubated for 13 to 15 days at +21° C. in a constant temperature room. After incubation, each sample was weighed to the sieves of a crumb analyzer (pore size 0.25 mm) in an amount of 4 g, and the soil material of the sieves was run in the crumb analyzer (Eijkelkamp Wet Sieving Apparatus) with a 3 minute program. During this time, the sieve was dipped into metal cups partially filled with water and lifted up a number of times, as a consequence of which the soil material dispersed, depending on the hardness of the crumbs. The mass of solid material was determined from filtrates of the metal cups by drying the filtrates at +105° C. in a hot air oven so as to be air-dry.

FIG. 1 shows the solid content of the filtrates in different samples. It is clearly visible that significantly more fine earth material was washed away from the control samples after incubation than from the MFC-treated soil samples. The addition of 0.016% MFC-N to soil almost entirely prevented washing away of the solid material. The finer ground MFC-L proved to be an even more efficient stabilizer—in the case of MFC-L, the addition of 0.008% stabilized the soil efficiently.

Example 2

Flow Profile in Dispersions of Microfibrillated Cellulose

In gel sowing and spreading solid fertilizer particles, a material having a high viscosity in the static resting state and a low viscosity at high shear rates is needed. This type of a material provides in the static state for the formation of stable seed and fertilizer suspensions and, on the other hand, a high dispensing speed e.g. in spraying. The ability of dilute MFC aqueous dispersions to provide the above-described rheological profile was demonstrated in a measurement series where the viscosity of MFC dispersions was measured over a large shear rate/stress range using a rotational rheometer (AR-G2, TA Instruments, UK) with the Vane geometry, which is shown in FIGS. 2 and 3. It was discovered that the MFC dispersion has a much higher viscosity at low shear rates than the other polymers used in soil conditioning. The level of the viscosity at rest was particularly high in the MFC-L sample where the diameter of mirofibrilated fibers was less than 50 nm. The stress at which the shear thinning starts was also significantly higher with the MFC dispersions than the reference samples. The greater the yield stress of a material, the better is the suspending ability. The viscosity of the MFC dispersions collapses after the shear stress exceeds the yield stress.

FIG. 2 shows the viscosity of 0.5% MFC dispersions as a function of the shear stress compared with 0.5% polyacrylamide (cationic, 5000 kDa) and carboxy-methyl cellulose (anionic, 250 kDa).

FIG. 3 shows the viscosity of 0.5% MFC dispersions as a function of the shear rate compared with solutions of 0.5% polyacrylamide and carboxy-methyl cellulose. The typical shear rate ranges of different physical processes are indicated by arrows in the figure. This graph shows that the viscosity of the MFC dispersions reaches the same level as the reference materials when the shear rate exceeds 200 $s^{-1}$. A low viscosity provides for example for efficient spraying.

Example 3

Suspending Ability in Dispersions of Microfibrillated Cellulose

As disclosed in Example 2, dilute MFC dispersions have a very high viscosity at low shear rates. The structure of the hydrogel is also recovered very quickly after shearing, e.g. spraying. In static conditions, the MFC forms a hydrogel structure having a high storage modulus and exceptionally high yield stress. These properties provide for the use of the MFC dispersions in suspending solid particles, e.g. seeds or fertilizer particles.

The MFC suspending ability was demonstrated by mixing 1 to 2 mm or 2 to 3 mm sand/gravel particles into 0.5% MFC-N or MFC-L dispersions. The suspensions being formed are stable for a very long time, as seen from FIG. 4.

Example 4

Microfibrillated Cellulose as Substrate

The ability of MFC to function as an aid in gel sowing was demonstrated by sowing seeds of timothy-grass onto a hydrogel formed by 1.6% MFC-N or 0.9% MFC-L. The seeds were found to adhere on the surface of the MFC gel and germinate well. The germinated seeds formed a root network through the MFC gel. The grass grew normally without separate fertilizers. The addition of water was not necessary, but washing the gel with water at intervals of two days was beneficial to growth.

Example 5

Formation of Surface Crust

The ability of microfibrillated cellulose to form an elastic surface crust to soil material was examined in the following manner:

The soil material to be examined in this example was clay earth or silty clay earth. The soil sample was screened to two size classes: a size calss of 0.06 to 0.2 mm and a size class of 0.2 to 1 mm. First, 150 g of soil samples was weighed into an assay vessel. A cellulose dispersion (chemically unmodified) (0.05 or 0.1 mass-%) was added onto the samples, such that sample concentrations of 45 or 90 kg/ha were obtained. The samples were then incubated for 3 days at +21° C. in a constant temperature room. The corresponding control samples were prepared.

The effect of the microfibrillated cellulose on wind erosion resistance and mechanical stress of the soil samples was examined by separating 75.0 g of earth from the soil sample. Also, the thickness of the surface crust that had been formed was determined to be able to examine the relation of the results of dry and wet screenings to the thickness of the crust.

For dry screening, a weighed soil sample was screened for 10 minutes at a time and 30 minutes all together (i.e. 3 batches/sample), and the mass of the receiver was weighed after each 10 minute run. The smaller the amount of earth passing the screen, the more resistant was the earth against wind erosion.

For wet screening, 4 g of soil sample was weighed onto a 0.25 mm screen. The screens were placed in a crumb analyzer and metal cylinders were placed thereunder with 100 g of deionized water being weighed therein. Then, the screen deck was lowered into the water of the metal cylinders and a 3 minute run of the crumb analyzer was started. During the run, the screen deck moved up and down, the intention of which was to simulate an abrupt exposure to heavy rain. After the run, the screens were left to dry at room temperature and the metal cylinders containing the soil material dispersed in water that had passed the screen were placed at +105° C. for drying. After the water had evaporated, the metal cylinders were weighed and, this way, the amount of earth that had passed the screen was determined. The smaller the amount of earth passing the screen, the better the earth resisted water erosion.

Table 1 discloses the results obtained in the tests.

TABLE 1

Thickness of surface crust in soil samples treated with cellulose dispersion and in the control

| Grade and size class (mm) of soil sample | Thickness of surface crust (cm) | | |
|---|---|---|---|
| | Content of cellulose dispersion (kg/ha) | | |
| | 45 | 90 | Control |
| Clay ground, 0.2-1 | 1.1 | 0.8 | 1.3 |
| Clay ground, 0.06-0.2 | 1.5 | 1.5 | 1.5 |
| Silty clay ground, 0.2-1 | 2.1 | 0.9 | 0.8 |
| Silty clay ground, 0.06-0.2 | 2.0 | 2.0 | 1.7 |

From the results of the tests it was discovered that the treating of soil material with microfibrillated cellulose provided to the soil an elastic and flaky crust which was clearly more resistant against mechanical stress than the surface crust of the control sample. In the surface crust, the earth particles are tightly bound to each other, as a consequence of which the surface crust prevents wind erosion.

The surface crust of the samples treated with the cellulose dispersion was found to comprise the above-mentioned elastic film and a portion formed by water and soil material under the film. In the case of the samples treated with the cellulose dispersion, the water migrated freely deeper into the soil, but the microfibrillated cellulose itself remained closer to the surface of the earth, whereby the microfibrillated cellulose formed a continuous film on the surface of the earth. From the results, it was also found that the continuous, thin and elastic flaky film formed by microfibrillated cellulose protected the aggregate structure of the soil from the stress produced by raindrops.

Example 6

Effect of Microfibrillated Cellulose on the Porosity of Soil

Soil samples were treated in the manner disclosed in Example 1. In the tests, chemically unmodified microfibrillated cellulose was used and concentrations of 160 ppm and 800 ppm were selected. The soil material to be examined in the tests was in this example clay ground or silty clay ground. After incubation, approximately 64 g of earth treated with the mixture composition was weighed onto the topmost screen of a dry screening machine and run on a 20 minute program. The particle fractions remaining on top of the screens of different sizes were weighed and the masses were proportioned to the total mass of the earth samples. The samples treated with the cellulose dispersion were compared with a control sample. Table 2 discloses the results obtained in the tests.

TABLE 2

Proportion (mass-%) of different fractions (size classes) of soil samples after dry screening

| Sample | Size class of fraction (mm) | | | | | |
|---|---|---|---|---|---|---|
| | <0.06 | 0.06-0.2 | 0.2-0.6 | 0.6-1 | 1-2 | >2 |
| Clay ground | | | | | | |
| Control | 2.6 | 4.6 | 11.0 | 8.8 | 23.0 | 50.0 |
| Cellulose dispersion (160 ppm) | 1.1 | 2.8 | 8.0 | 7.0 | 22.6 | 58.5 |
| Cellulose dispersion (800 ppm) | 0.15 | 0.75 | 1.0 | 0.6 | 2.1 | 95.4 |
| Silty clay ground | | | | | | |
| Control | 5.0 | 39.1 | 18.7 | 6.6 | 11.1 | 19.5 |
| Cellulose dispersion (160 ppm) | 9.0 | 26.3 | 16.0 | 8.4 | 15.2 | 25.1 |
| Cellulose dispersion (800 ppm) | 7.1 | 26.3 | 18.0 | 9.0 | 16.0 | 23.6 |

From the results of the tests it could be seen that the chemically unmodified microfibrillated cellulose made the soil material coarser, i.e. provided more larger aggregates, for example in a size class of more than 1 mm, compared with the control sample. From the results of the tests it was discovered that treating the soil samples with the cellulose dispersion clearly increased the proportion of the coarser mass of the samples. The larger the proportion of the coarser material in the mass of the soil, the better the earth resists mechanical stress such as the effect of wind. The growth of volume of the examined sample thereby correlates with lower wind erodability.

The method according to the invention is suitable as different embodiments to be used for treating most different soil materials.

The invention is not limited merely to the examples referred to above; instead, many variations are possible within the scope of the inventive idea defined by the claims.

The invention claimed is:

1. A method for treating soil material, wherein the soil material is treated by a mixture composition containing at least chemically unmodified microfibrillated cellulose and water for bonding soil particles together.

2. The method according to claim 1, wherein the particles of the soil material are bound to the soil material by the mixture composition.

3. The method according to claim 1 or 2, wherein the mixture composition is spread to the surface of the soil material.

4. The method according to claim 1, wherein the mixture composition is mixed with the soil material.

5. The method according to claim 1, wherein the mixture composition contains less than 5 w-% of microfibrillated cellulose.

6. The method according to claim 1, wherein the water content of the mixture composition is adjusted.

7. The method according to claim 1, wherein the mixture composition containing microfibrillated cellulose is formed from a dried and/or concentrated cellulose raw material by fibrillating.

8. The method according to claim 1, wherein the soil material is treated by the mixture composition in order to form a surface crust to the soil material.

9. The method according to claim 1, wherein the soil material is treated by the mixture composition in order to form soil aggregates.

10. A gel sowing mixture composition, wherein the mixture composition contains at least chemically unmodified microfibrillated cellulose and water and is in gelatinous form.

* * * * *